(12) United States Patent
Ning (10) Patent No.: US 10,023,795 B2
(45) Date of Patent: Jul. 17, 2018

(54) CERAMIC COMPOSITE SYSTEMS AND METHOD

(71) Applicant: Arizona Board of Regents on behalf of Arizona State University, Scottsdale, AZ (US)

(72) Inventor: Cun-Zheng Ning, Chandler, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 177 days.

(21) Appl. No.: 15/003,054

(22) Filed: Jan. 21, 2016

(65) Prior Publication Data

US 2016/0208163 A1 Jul. 21, 2016

Related U.S. Application Data

(60) Provisional application No. 62/106,108, filed on Jan. 21, 2015.

(51) Int. Cl.
C09K 11/77 (2006.01)
C04B 35/44 (2006.01)
(Continued)

(52) U.S. Cl.
CPC ........ C09K 11/7706 (2013.01); C04B 35/053 (2013.01); C04B 35/16 (2013.01);
(Continued)

(58) Field of Classification Search
CPC ... C09K 11/7706; C04B 35/053; C04B 35/44; C04B 35/443; C04B 35/50;
(Continued)

(56) References Cited

U.S. PATENT DOCUMENTS 5,897,945 A 4/1999 Lieber et al.
6,036,774 A * 3/2000 Lieber .................... C30B 23/00
117/105
(Continued)

OTHER PUBLICATIONS

Yin et al., "Synthesis and Characterization of Erbium Compound Nanowires as High Gain Optical Materials", 2013, Dissertation Publishing, University of Arizona, 180 pages.*
(Continued)

*Primary Examiner* — Matthew E Hoban
*Assistant Examiner* — Lynne Edmondson
(74) *Attorney, Agent, or Firm* — Greenberg Traurig LLP (57) ABSTRACT

Embodiments of the invention provide a ceramic composites and synthesis methods that include providing a plurality of nanoparticles with at least one first rare-earth single-crystal compound, and mixing the plurality of nanoparticles with at least one ceramic material and at least one ceramic binder including at least one solvent. The method further includes preparing a ceramic green-body from the mixture, and sintering the ceramic green-body to form a ceramic composite of a polycrystalline ceramic with a plurality of embedded single-crystal nanorods. The embedded single-crystal nanorods include at least one second rare-earth single crystal compound. The at least one second rare-earth single crystal compound can include or be derived from the at least one first rare-earth single crystal compound.

2 Claims, 11 Drawing Sheets (51) Int. Cl.
*C04B 35/50* (2006.01)
*B22F 1/00* (2006.01)
*C04B 35/76* (2006.01)
*C04B 35/053* (2006.01)
*C04B 35/16* (2006.01)
*C04B 35/443* (2006.01)
*C04B 35/505* (2006.01)
*C04B 35/515* (2006.01)
*C04B 35/553* (2006.01)
*C04B 35/622* (2006.01)
*C04B 35/626* (2006.01)
*C04B 35/80* (2006.01)

(52) U.S. Cl.
CPC ............ *C04B 35/44* (2013.01); *C04B 35/443* (2013.01); *C04B 35/50* (2013.01); *C04B 35/505* (2013.01); *C04B 35/5152* (2013.01); *C04B 35/553* (2013.01); *C04B 35/6224* (2013.01); *C04B 35/62615* (2013.01); *C04B 35/76* (2013.01); *C04B 35/803* (2013.01); *C04B 2235/3203* (2013.01); *C04B 2235/3208* (2013.01); *C04B 2235/3217* (2013.01); *C04B 2235/3225* (2013.01); *C04B 2235/3418* (2013.01); *C04B 2235/3427* (2013.01); *C04B 2235/441* (2013.01); *C04B 2235/444* (2013.01); *C04B 2235/445* (2013.01); *C04B 2235/5276* (2013.01); *C04B 2235/764* (2013.01); *C04B 2235/80* (2013.01); *C04B 2235/9653* (2013.01)

(58) Field of Classification Search
CPC . C04B 35/505; C04B 35/5152; C04B 35/553; C04B 35/76; C04B 35/803; B82Y 30/00; B82Y 20/00; H01S 3/169; H01S 5/4093; B22F 1/0025; C01P 2004/16
USPC .... 252/301.4 R, 301.4 H; 977/762, 700, 951
See application file for complete search history.

(56) References Cited

U.S. PATENT DOCUMENTS

| | | |
|---|---|---|
| 6,650,670 B1 | 11/2003 | Shimoji |
| 7,943,106 B2 | 5/2011 | Robinson |
| 8,168,291 B2 | 5/2012 | Shah et al. |
| 2003/0010420 A1 | 1/2003 | Morrow |
| 2013/0277625 A1* | 10/2013 | Srinivas .................. H01B 1/02 252/514 |
| 2014/0098411 A1* | 4/2014 | Kim ...................... H01S 3/1685 359/341.5 |
| 2014/0299359 A1* | 10/2014 | Mittal ............... H01L 31/02246 174/251 |

OTHER PUBLICATIONS

J. Akiyama et al., "First Demonstration of Rare-Earth-Doped Anisotropic Ceramic Laser", The European Conference on Lasers and Electro-Optics 2011, Munich, Germany, May 2011.

M. Richardson et al., "Transparent ceramics for lasers—A gamechanger", American Ceramic Society Bulletin, vol. 91, No. 4, pp. 30-33, 2012.

J. Sanghera et al., "Ceramic Laser Materials", Materials, vol. 5, pp. 258-277, 2012.

Y. Sato et al., "Micro-domain controlled anisotropic laser ceramics assisted by rare-earth trivalent", in Proc. SPIE 8206, Pacific Rim Laser Damage 2011: Optical Materials for High Power Lasers, 82061T, Shanghai, China, Nov. 2011.

* cited by examiner

| Material | α (µm/m°C) | cp (J/g°C) | Tm (°C) | Tm Conditioning | σ | Eg/λt | P |
|---|---|---|---|---|---|---|---|
| MgO | 60 | 11.9 | | 2 | | 19 | |
| MgAl2O3 (Spinel) | | | 2135 | 2 | | 13.2 | |
| α-Al2O3 * | | | 2030 | 2 | | | |
| Y2O3 | 13.6 | 7.4 | 2425 | 2 | | | 14 |
| Sc2O3 | 16.5 | 6.7 | 2485 | 2 | | | 16 |
| La2O3 | 12.5 | 5.5 | 2490 | 2 | | | |
| Y3Al5O15 (YAG) | | 6.1 | 1940 | 1.2 | | 7.83 | |
| CaF2 | 9.2 | 19.6 | 1418 | | | | 1.6 |
| SrTiO3 | 12 | 9.4 | 2080 | 1.1 | | Non-linear | ? |
| LG-750 glass | | 13.2 | Tg=450 | 0.48 | 1.52 | −5.1 | 0.30 |

FIG. 3

= Preferred properties

CERAMIC COMPOSITE SYSTEMS AND METHOD

RELATED APPLICATIONS

This application claims priority from U.S. Provisional Application No. 62/106,108, filed on Jan. 21, 2015, the entire contents of which are incorporated herein by reference.

STATEMENT REGARDING FEDERAL SPONSORED RESEARCH OR DEVELOPMENT

Some research conducted for conception and development of at least one embodiment of the invention described herein was made using Federal support awarded by the Army Research Office under Grant No. W911NF-08-1-0471, and Grant No. FA9550-10-1-0444 by the Air Force Office of Scientific Research, and Grant No. 1228512 by the National Science Foundation. The government has certain rights in the invention.

BACKGROUND

Rare-earth doped ceramics have shown great potential as gain materials for high energy lasers in many industrial and defense applications. However, significant deficiencies exist in current ceramic technology to meet the demands of such applications. Rare-earth doped ceramic laser materials typically suffer from several key drawbacks including; i) low doping density due to the low solubility of rare-earth elements in typical solid hosts, limiting the optical gain to a relatively low level; ii) rare-earth ion clustering due to inhomogeneous distribution of doped ions at moderate and high doping levels; iii) rare-earth to rare-earth, rare-earth defect, and rare-earth grain-boundary interactions; and iv) other nonlinear effects lead to degradation of light emission, or nonlinear saturation of optical gain. In addition to doping level limitation, doped single crystal materials are expensive and difficult to make in large enough volumes for high power applications.

In comparison, ceramic laser materials have advantages of low cost and can be fabricated into arbitrary shapes with large volume or quantity, and with higher dopant concentration. However, ceramic materials can be problematic when used in optical application due to the interaction of dopants with scattering centers such as grain boundaries and various defects that can lead to reduction of optical gain, and serious material degradation.

Rare-earth compounds, such as various rare-earth oxides and silicates are promising alternatives to doped (single crystal, glass, or ceramic) materials. Unlike doped materials, rare-earth compounds contain light emitting rare-earth ions as integral components of their periodic crystal structures, rather than extrinsic, randomly introduced dopants. Thus, the rare-earth ions are periodically distributed in the crystal compounds with extremely high density. Various methods have been used for producing rare-earth compound crystals such as wet-chemistry, sol-gel methods, metal-organic molecular beam epitaxy, and magnetron sputtering. However, research has shown that most of the materials produced using these methods are of poor crystal quality, and show weak light emission even after high temperature annealing. Moreover, producing enough of these materials to create a large enough volume of gain materials for commercial waveguide or laser structures has proved challenging. Because annealing becomes less effective when thick materials are grown, these materials are typically produced with thicknesses of the order of hundreds of nanometers.

Single crystal rare-earth compounds such as single crystal erbium chloride silicate and its alloy with yttrium chloride silicate have recently been produced in nanorod form. Using these methods, single crystal erbium chloride silicate and yttrium chloride silicate compounds with high and controllable erbium (Er) density have been synthesized. Moreover, highly crystalline single crystal erbium chloride silicate and yttrium chloride silicate compounds have been shown to lead to strong light emission around 1.53 µm wavelengths, and have been shown to have superior optical properties including strong light emission, weak up-conversion, larger signal enhancement, and higher optical gain when compared with rare-earth doped materials or other polycrystalline rare-earth compounds. However, although single crystal rare-earth compound nanorod materials possess many superior optical properties, their size and morphology make them poorly suited for applications such as in high energy laser materials.

Accordingly, there is a need to develop nanorod-based materials in large volume with various required shapes for future high energy lasers used in defense and industrial applications. In particular, there is a need to develop large volumes of high-quality rare-earth compositions that retain the key advantages provided by ceramic materials (such as low cost and large volume or quantity), while providing along the superior optical properties of single-crystal materials.

SUMMARY

Embodiments of the invention include a ceramic composite synthesis method comprising providing a plurality of nanoparticles comprising at least one first rare-earth single-crystal compound, and mixing the plurality of nanoparticles with at least one ceramic material and at least one ceramic binder including at least one solvent. The method further includes preparing a ceramic green-body from the mixture, and sintering the ceramic green-body to form a ceramic composite comprising a polycrystalline ceramic with a plurality of embedded single-crystal nanorods. The embedded single-crystal nanorods comprise at least one second rare-earth single crystal compound.

In some embodiments, the at least one ceramic material comprises $MgAl_2O_4$ spinel. In some further embodiments, the at least one ceramic material comprises yttria alumina garnet. In some embodiments, at least a fraction of the plurality of nanoparticles include nanorods comprising the at least one first rare-earth single-crystal compound. In some embodiments, the at least one first rare-earth single-crystal compound comprises erbium silicate.

In some further embodiments, the at least one first rare-earth single-crystal compound comprises single crystal erbium chloride and the ceramic composite is an alloy with yttrium (Y) chloride silicate (CS), where the at least one second rare-earth single crystal compound comprises $Er_xY_{1-x}CS$ formed in-situ, where x is 0 to 13.

In some embodiments, the method further includes adding at least one sintering aid to the least one ceramic material and at least one ceramic binder prior to sintering the ceramic green body. In some embodiments, the sintering aid includes at least one of tetraethyl orthosilicate, LiF, and $AlCl_3$. In some other embodiments, least a portion of the ceramic composite is at least partially transparent.

In some embodiments of the invention, least a portion of the at least one second rare-earth single-crystal compound is formed in-situ and derived from at least a portion of the at least one first rare-earth single-crystal compound. In other embodiments, at least a portion of the at least one second rare-earth single-crystal compound comprises the at least one first rare-earth single-crystal compound.

In some embodiments, at least one first or second rare-earth single-crystal compound includes a rare-earth element that is selected from the group consisting of Er, Yb, Nd, and Y, and mixtures thereof. In some embodiments, the at least one ceramic includes at least one of MgO, MgO—$Al_2O_3$, $Y_2O_3$, $Se_2O_3$, $Lu_2O_3$, $Y_3Al_5O_{15}$, and $CaF_2$.

In some embodiments, the at least one organic binder includes at least one of carboxymethylcellulose, polyvinyl alcohol, and mixtures thereof. In some embodiments of the method, mixing of the plurality of nanoparticles with at least one ceramic material and at least one ceramic binder including at least one solvent is accomplished using stirring, vibrating, rolling, shaking, grinding, or combination of these methods. In other embodiments, the mixing is accomplished using a high-energy ball mill.

Some embodiments of the invention include a ceramic composite material comprising a ceramic matrix comprising a polycrystalline ceramic with a plurality of single-crystal nanorods, the polycrystalline ceramic selected from the group consisting of MgO, MgO—$Al_2O_3$, $Y_2O_3$, $Sc_2O_3$, $Lu_2O_3$, $Y_3Al_5O_{15}$, $CaF_2$, and mixtures thereof, and the plurality of single-crystal nanorods including embedded single-crystal nanorods comprising at least one rare-earth single crystal compound, wherein the at least one rare-earth single crystal compound is selected from the group consisting of Er, Yb, Nd, and Y, and mixtures thereof.

In some embodiments, at least a portion of the embedded single-crystal nanorods are formed in-situ and derived from at least one rare-earth single-crystal compound sintered with the polycrystalline ceramic. In some further embodiments of the invention, at least a portion of the embedded single-crystal nanorods originate from at least one rare-earth single-crystal compound sintered within the polycrystalline ceramic.

Some embodiments of the invention include a ceramic composite material comprising a ceramic matrix comprising a polycrystalline ceramic with a plurality of single-crystal nanorods embedded in a polycrystalline ceramic matrix. The plurality of single-crystal nanorods being formed in-situ through a sintering reaction of single crystal erbium chloride and yttrium (Y) chloride silicate (CS), the plurality of embedded single-crystal nanorods comprising $Er_xY_{1-x}CS$, where x is 0 to 13.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Embodiments of the invention described herein include compositions and methods of making those compositions for use in laser ceramics, and other optical and energy applications. In particular, some embodiments of the invention include preparing single crystal rare-earth compound ("SinCREC") nanorods, and embedding those nanorods in various ceramic compositions. Moreover, in some embodiments, the ceramic materials can comprise transparent ceramic materials. In some embodiments, SinCREC nanorods can be grown using chemical vapor deposition, and then mixed with commercial ceramic powders for processing under controlled high pressure and high temperature environments. In some embodiments, SinCREC nanorods such as single crystal erbium chloride silicate ("ECS") and its alloy with yttrium chloride silicate ("YCS") can be produced in nanorod form with continuously controllable alloy composition x in $Er_xY_{1-x}CS$ where x can be from x=0 to x=13. For example, see the disclosure of A. L. Pan, L. J. Yin, Z. C. Liu, M. H. Sun, R. B. Liu, P. L. Nichols, Y. G. Wang, and C. Z. Ning, Single-crystal erbium chloride silicate nanowires as a Si-compatible light emission material in communication wavelengths, Opt. Mater. Exp, Vol. 1, No. 7, pp. 1202-1209, 2011, and L. Yin, H. Ning, S. Turkdogan, Z. Liu, P. L. Nichols, and C. Z. Ning, Long lifetime, high density single-crystal erbium compound nanowires as a high optical gain material, Appl. Phys. Lett., 100, 241905(2012), and L. J. Yin, D. Shelhammer, G. J. Zhao, Z. C. Liu and C. Z. Ning, Erbium concentration control and optimization in erbium yttrium chloride silicate single crystal nanowires as a high gain material, Appl. Phys. Lett. 103, 121902 (2013), and Z. C Liu, L. J. Yin, C. Z. Ning, Extremely Large Signal Enhancement in an Erbium Chloride Silicate Single-Crystal Nanowire, CLEO: Science and Innovations; June 2013, San Jose, Calif., and Z. C. Liu, G. J. Zhao, L. J. Yin, C. Z. Ning, Demonstration of Net Gain in an Erbium Chloride Silicate Single Nanowire Waveguide, CLEO: Science and Innovations, June 2014, San Jose, Calif., and L. J. Yin, "Synthesis and Characterization of Erbium Compound Nanowires as High Gain Optical Materials", PhD Dissertation, Arizona State University, 2013, the entire contents of which are incorporated herein by reference.

Figure 1:
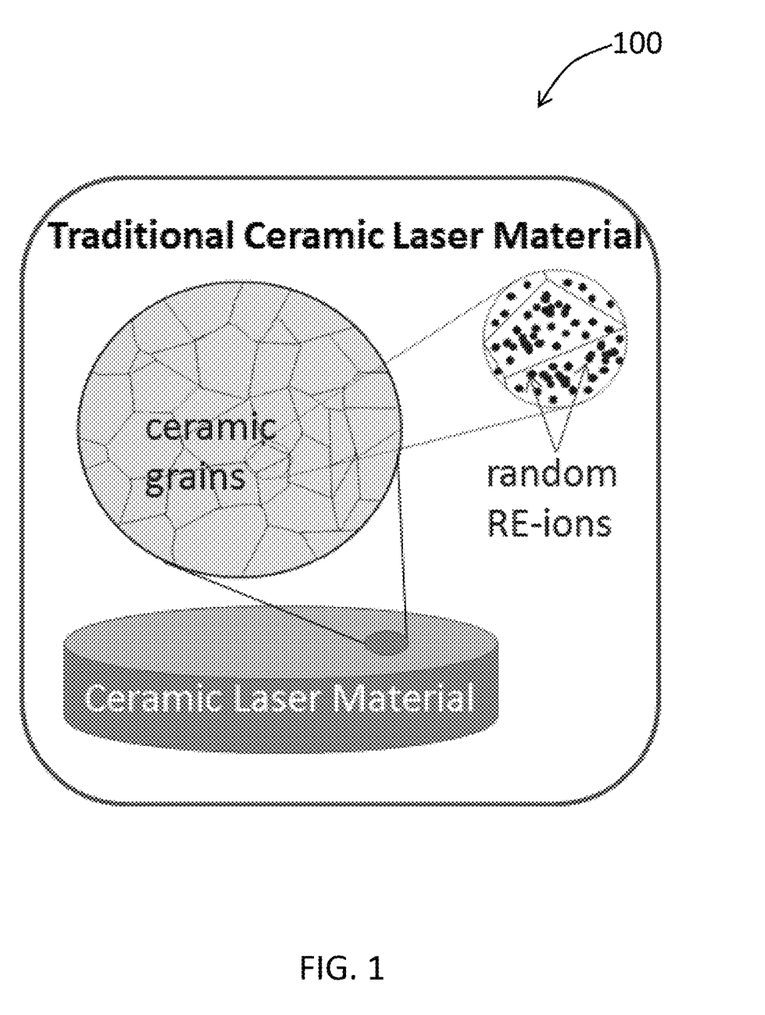
FIG. 1 provides an illustration of a conventional ceramic laser material.

FIG. 1 provides an illustration 100 of conventional ceramic laser material produced using conventional ceramic processing methods. Rare-earth based ceramic compounds producing using these conventional methods generally include extrinsic, randomly introduced dopants that can segregate non-uniformly between ceramic grain boundaries (e.g., as shown in the example microstructure in FIG. 1, showing Er ions associated with grain boundary microstructure). Instead of doping ceramic powders with randomly distributed rare-earth ions as in conventional ceramic laser materials illustrated in FIG. 1, embodiments of the invention can include methods and compositions based on SinCREC nanorods, where rare-earth atoms can be contained in a periodic manner in a single crystal environment with extremely high density ($10^{21}$-$10^{22}$ $cm^{-3}$). In some embodiments, such compounds can at least minimize or avoid the aforementioned detrimental effects that can occur in doped materials, including for example problems with low doping density, quenching or gain saturation effects at moderate to high doping levels, and rare-earth ion interactions with localized defects and grain boundaries.

Figure 2:
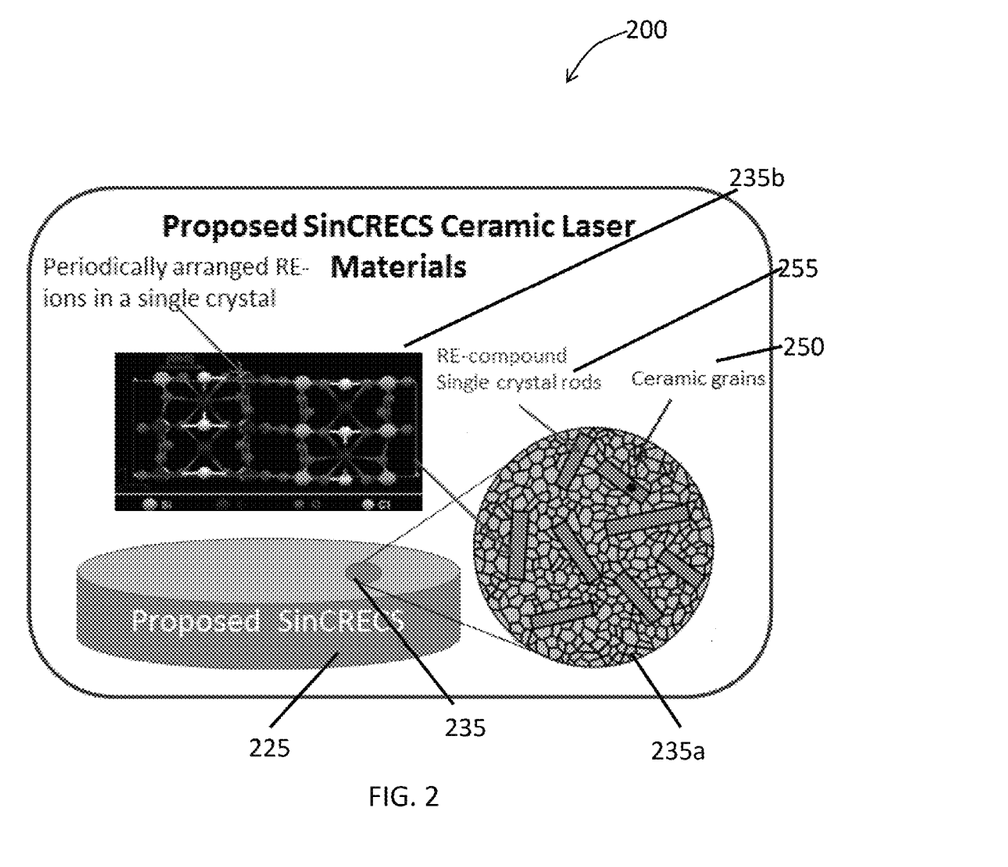
FIG. 2 depicts a ceramic laser material microstructure incorporating single crystal lattice structures in accordance with some embodiments of the invention.

FIG. 2 depicts an overview 200 of a ceramic laser material microstructure and single crystal lattice structure in accordance with some embodiments of the invention. In some embodiments of the invention, SinCREC nanorods can be embedded in various ceramic compositions to produce ceramic composites with various concentrations and distributions of SinCREC nanorods (represented as SinCREC nanorod-based ceramic or ceramic composite 225). Some of the methods described herein can enable the rare-earth content to be readily controlled through physical mixing of ceramic powders with the SinCREC nanorods. Further, some methods of the invention can include morphology control of SinCREC nanorod growth, and ceramic processing methods using novel composite powder mixtures with embedded SinCREC nanorods. For example, the overview 200 depicts a representation of SinCREC nanorod-based ceramic or ceramic composite 225, and region 235 is shown as a representative microstructure 235a of the SinCREC nanorod-based ceramic or ceramic composite 225, illustrating SinCREC nanorods 255 embedded in a ceramic matrix 250.

In some embodiments of the invention, the various SinCREC nanorods and SinCREC nanorod-based ceramics and ceramic composites 225 described herein can comprise a periodic arrangement of active rare-earth ions that is distinctly different from the randomly distributed ions typically found in doped materials. This is shown represented within the overview 200 as lattice view 235b of the microstructure 235a. As a consequence, in some embodiments of the invention, ion-clustering and related emission quenching or nonlinear saturation such as energy transfer (or cooperative) up-conversion can be at least minimized or avoided. Further, strong bonding of rare-earth ions in the single crystal nanorods can prevent or minimize diffusion of active ions to grain boundaries. The active rare-earth ions can be positioned in perfect crystal environments, minimizing the interaction between rare-earth ions and the localized defects and grain boundaries. Moreover, the high quality single crystal environment of the various SinCREC nanorod-based ceramics and ceramic composites 225 can reduce the inhomogeneous broadening of spectral lines in some embodiments.

In some embodiments of the invention, the density of rare-earth ions can be controlled by changing the ratio of SinCREC nanorods 255 in the SinCREC nanorod-based ceramic or ceramic composite 225. For example, in some embodiments of the invention, the density of rare-earth ions can be controlled by changing the ratio of SinCREC nanorods 255 to the ceramic powder in the physical mixture batch prior to ceramic processing. This is distinct from conventional doped materials that are limited by chemical solubility of rare-earth dopants as in the conventional doped ceramic material (illustrated in FIG. 1).

In some embodiments of the invention, the various SinCREC nanorod-based ceramics and ceramic composites 225 described herein can utilize wide range of host ceramic materials. Again, this is distinct from conventional laser ceramics with rare-earth dopants, where the selection of the host ceramic materials needs to be driven at least in part by appropriate types and size of bonding sites to accommodate the trivalent rare-earth ions. These restrictions are absent in the compositions and methods embodiments disclosed, where a broad range of ceramic host materials can be used and optimized for a variety of properties including, but not limited to thermal conductivity, thermal expansion coefficients, fracture toughness, and index of refraction, etc. For example, magnesium aluminate spinel (MgAl$_2$O$_4$, and hereafter referred to as "MAS") has a superior set of material attributes, but is not typically used as a ceramic laser material due to various other limitations.

In some embodiments of the invention, SinCREC nanorod-based ceramics and ceramic composites 225 described herein can comprise various SinCREC nanorod materials where the rare-earth element can be Er, Yb, Nd, Y. Depending on requirements of specific applications such as wavelengths of laser operation, various rare-earth elements can be used in these compositions. Further, in some embodiments of the invention, SinCREC nanorod-based ceramics and ceramic composites 225 described herein can utilize various ceramic powders as ceramic hosts. Without the requirement to ensure ionic matching between the rare-earth ions and the ions to be replaced in the structure of ceramic host, various materials that are not suited for traditional doped materials can be used in various embodiments of the invention. Some of these materials can have preferred thermal, optical, mechanical properties. For example, MAS is one such example that can be used to prepare a transparent ceramic or ceramic composite. Other example embodiments can include yttria alumina garnet (hereinafter "YAG") based ceramic or ceramic composites. For example, some embodiments can comprise YAG and MAS. Transparent MAS possesses a unique combination of preferred properties such as high melting point, high mechanical strength at elevated temperature, high chemical inertness, low thermal expansion coefficient, and higher thermal conductivity, and high thermal shock resistance. Furthermore, MAS has a better match of refractive index (n) with ECS nanorods, where n is about 1.72 for MAS and is closer to the value for ECS (about 1.7) than YAG, where n is about 1.82. Therefore, MAS can be a preferred candidate as a host matrix for our ECS nanorods.

Figure 3:
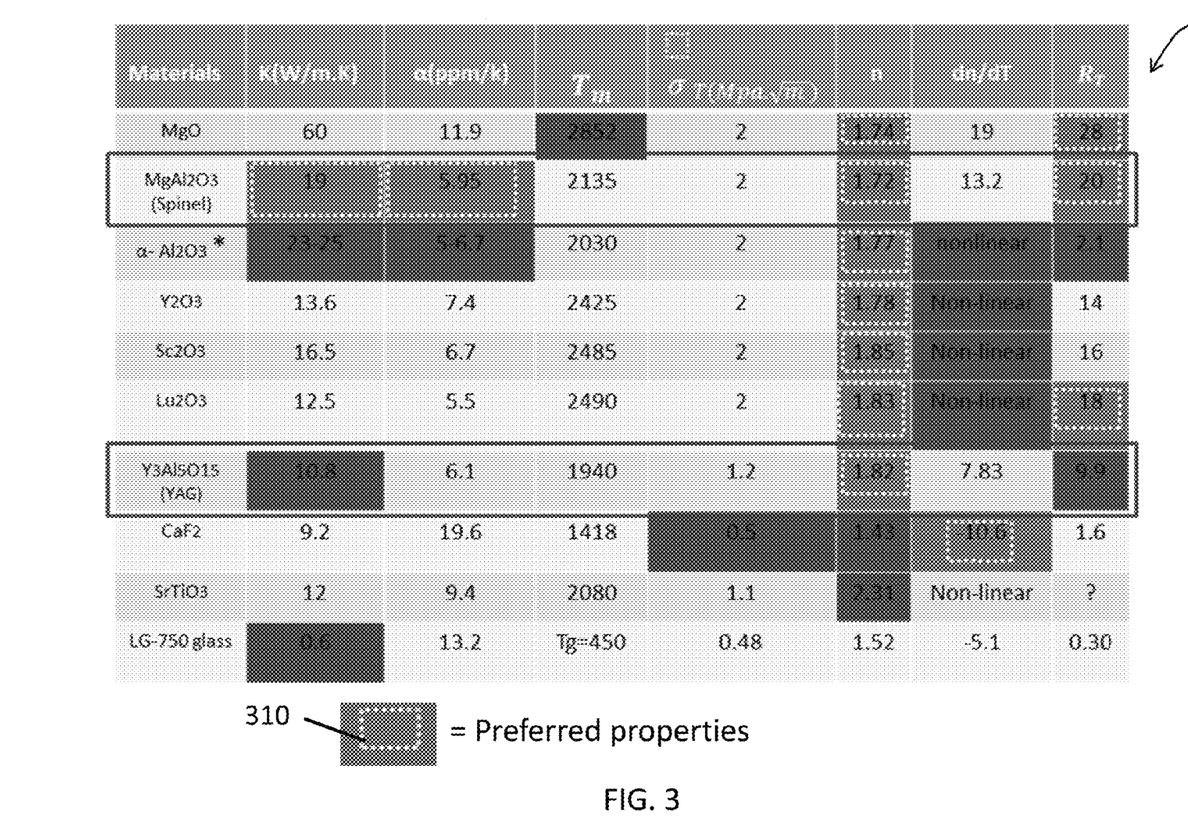
FIG. 3 shows a table of key parameters of various ceramic powders that can be used as a host in accordance with some embodiments of the invention.

The methods described herein need not be limited by the compositions described earlier. For example, in some embodiments, selection of the ceramic host materials can be guided by various physical and performance requirements, including thermal requirements such as thermal conductivity and thermal expansion (as low as possible) to enable a mechanically stable material to be produced with minimal variability, and high fracture toughness. Further, in some embodiments, selection of the ceramic host materials can be guided by optical specifications where the refractive index of the ceramic host is chosen to match or closely match with that of the SinCREC to minimize scattering loss for large grain sizes, and to provide high transparency for the emission and pump absorption wavelengths. FIG. 3 shows a table of parameters of various ceramic powders in accordance with some embodiments of the invention. Some of the listed ceramic powders include preferred properties (shown as 310), and at least some of the compounds as shown can be used to form embodiments of the invention as described herein. For example, compounds with at least one preferred parameter can include MgO, MgO—Al$_2$O$_3$, Y$_2$O$_3$, Sc$_2$O$_3$, Lu$_2$O$_3$, Y$_3$Al$_5$O$_{15}$ (YAG), and CaF$_2$.

Figure 6A:
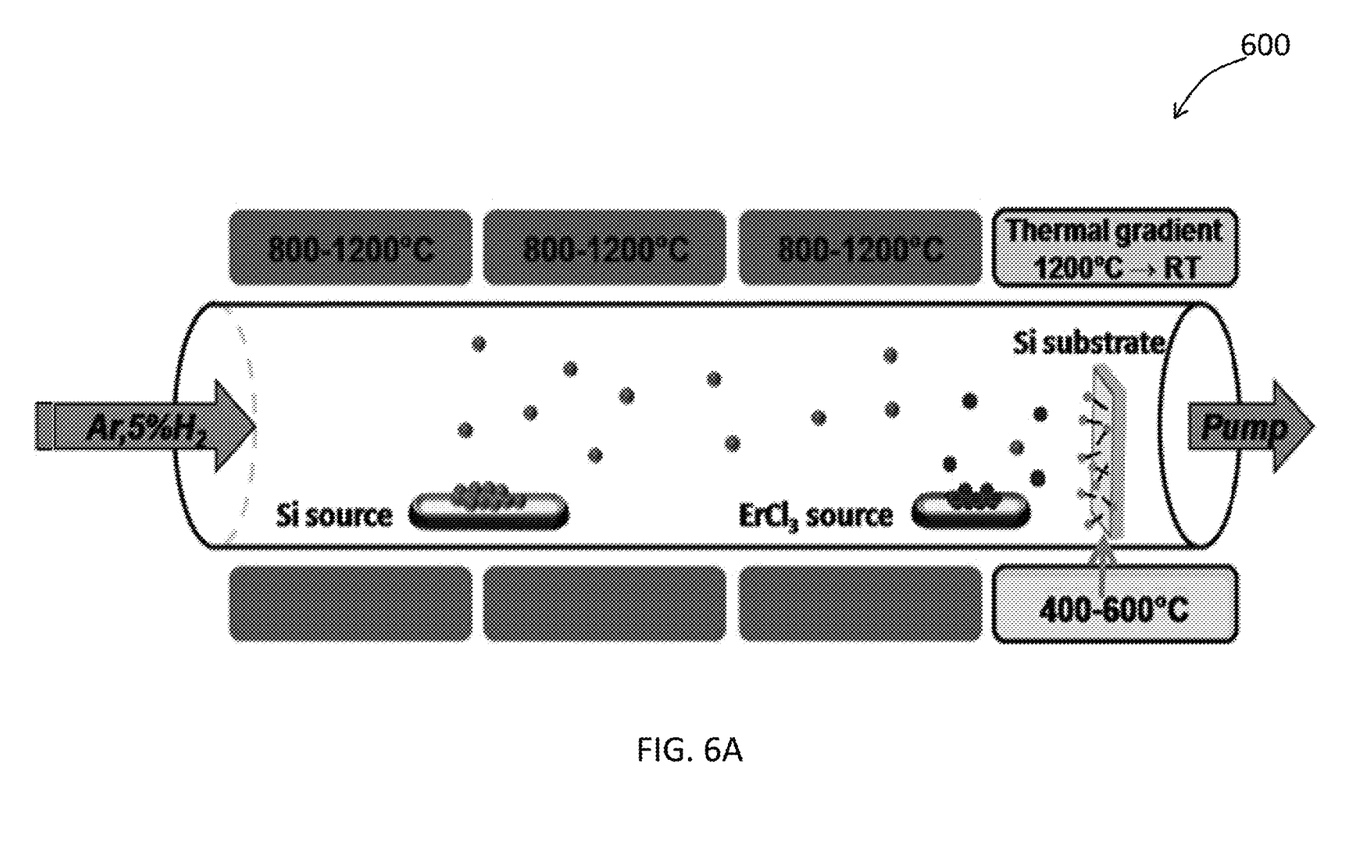
FIG. 6A shows a schematic of a horizontal three-zone reactor and process for producing ECS nanorods in accordance with some embodiments of the invention.
Figure 6B:
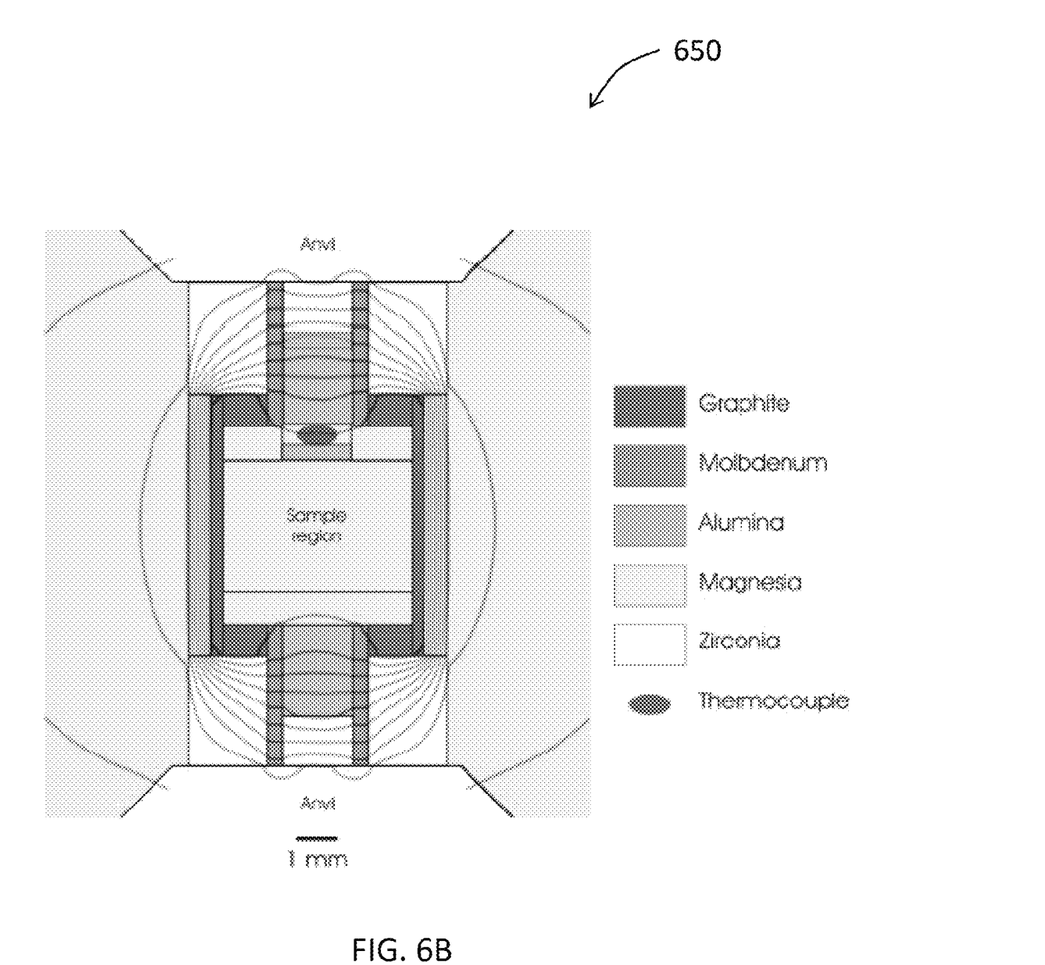
FIG. 6B shows a schematic of a high-pressure cell assembly in a multi anvil apparatus used for forming embodiments of the invention.

In some embodiments of the invention, the method of producing SinCREC nanorod-based ceramics and ceramic composites 225 described herein can comprise synthesis of SinCREC nanorods that are further pre-mixed with the one or more ceramic powders to produce one or more starting powders for the subsequent ceramic processing and sintering under appropriate pressure and thermal conditions. The sintering of the starting powder can lead to reduction in size of the pores and densification of the materials in some embodiments. Depending on the temperature and/or pressure ranges used, various tools such as piston cylinder or multi-anvil cell ("MAC") can be used. For example, FIG. 6B shows a schematic of a high-pressure cell assembly 650 in a multi-anvil apparatus used for forming embodiments of the invention. In some embodiments of the invention, the multi-anvil ("MA") technique for high-pressure synthesis, reactions and sintering can enable the processing of materials (such as various embodiments of SinCREC nanorod composite materials) at pressures of a few GPa to over about 25 GPa and simultaneous uniform temperatures up to 2500° C. or higher. Moreover, extensive experimental characterizations including electron-microscopy, structural and thermal measurements, and various optical measurements can be carried out to study the processing conditions, and to determine the ceramic material properties.

In some embodiments, the method of producing SinCREC nanorod-based ceramics and ceramic composites described herein can comprise the preparation and treatment of ceramic powder including processing of the transparent YAG and MAS ceramic materials produced by various ceramic processing methods known in the art, including, but not limited to sol-gel wet chemical methods. For example, in wet-chemical synthesis of YAG, an aqueous solution of aluminum and yttrium is prepared, and dried to a resin material. The resin material is then calcined, and a raw YAG oxide powder can be obtained with a high degree of homogeneity and dispersion. Using this simple synthesis method, an average particle size of below about 1 μm can be achieved (which is preferred for the fabrication of small grain ceramics).

In some embodiments of the invention, the above described method can be used for mixing small grain ceramics. In some embodiments, the prepared powder can be used as a host, and ECS and/or erbium silicate ("ES") nanorods can be mixed with the ceramic powder to produce SinCREC ceramics with embedded nanorods. Depending on the required grain size, commercial ceramic powders can be used, or various ceramic powders can be synthesized using methods known in the art. In some embodiments, a ceramic powder (e.g. a YAG or MAS ceramic powder) can be mixed with at least one solvent and at least one organic binder (e.g., such as carboxymethylcellulose or polyvinyl alcohol, or mixtures thereof). The ceramic powder, solvent, and binder can be mixed by stirring, vibrating, rolling, shaking, and/or ground using a high-energy ball mill (e.g., using a ball-mill that can accommodate sizes ranging from about 0.2 grams to about 10 grams). In this instance, the high-energy ball mill can be used to break strong agglomerates, and causing powder size reduction and an associated higher surface area which can promote surface diffusion during sintering process.

Typically, sintering aids are added to the starting ceramic powder to facilitate low temperature sintering process for enhanced densification (liquid phase sintering). However, they can commonly segregate to grain boundaries forming secondary phase after sintering that may act as the light scattering centers. To prevent the formation of the second phases in the microstructure of highly transparent ceramic, any sintering aid must either not affect the optical properties of the host materials, or the resulting phase segregation should be eliminated during processing. For example, in some embodiments of the invention, tetraethyl orthosilicate ("TEOS") and MgO composite or SiO$_2$ sintering aids can be used as appropriate additives in obtaining highly transparent YAG ceramics. Further, in some embodiments, additives such as LiF and $AlCl_3$ can be used for sintering of $MgAl_2O_4$.

Figure 4:
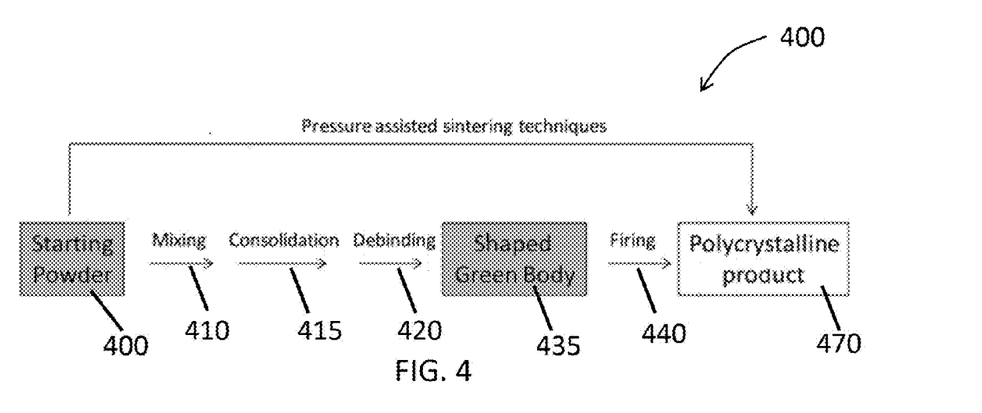
FIG. 4 illustrates an overview of a process flow for producing transparent ceramic materials in accordance with some embodiments of the invention.

Referring to FIG. 4, illustrating an overview of a process flow 400 for producing transparent ceramic materials. some embodiments include pressure assisted sintering techniques starting with a ceramic powder 400, converting the ceramic powder 400 to a shaped green body 435, and to a polycrystalline product 470. In some embodiments, conversion from powder 400 to green body 435 can include mixing 410, consolidation 15, and debinding 420. In some embodiments, conversion of the green body 435 to product 470 can be accomplished using a firing process (shown as 440). In some embodiments, the aforementioned SinCREC nanorod-based ceramic or ceramic composite 225 can comprise the polycrystalline product 470.

Figure 5:
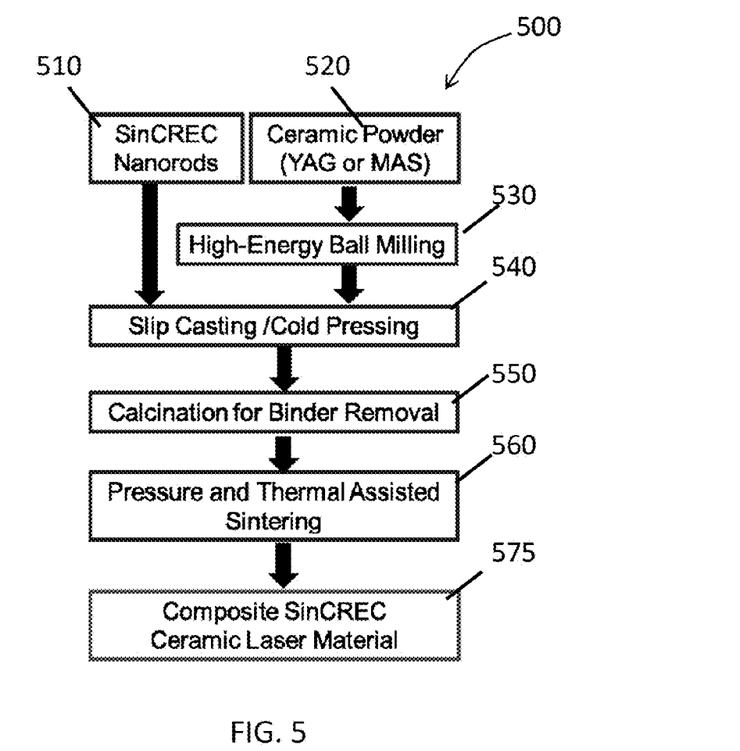
FIG. 5 illustrates a process flow for producing ceramic materials including embedded nanorods in accordance with some embodiments of the invention.

In some embodiments of the method, a slip casting forming method can be used during which a slurry of milled ceramic powder and SinCREC nanorods can be poured into a gypsum mold and dried to obtain a pellet of a preferred size. For example, FIG. 5 illustrates a process flow 500 for producing ceramic materials including embedded nanorods in accordance with some further embodiments of the invention. Some embodiments include the method of producing SinCREC nanorod-based ceramics and ceramic composites 225 described with green body forming and densification (following preparation and mixing as described earlier in FIG. 4). Further, in some embodiments, subsequent steps can comprise addition of SinCREC nanorods 510 to the treated ceramic powder (shown as 520) and formation of the green body to a specified shape (e.g., such as a pellet shape).

In some embodiments, the SinCREC nanorods 510 and ceramic powder 520 can be mixed using a high energy ball milling process 530 and then slip cast and cold pressed (shown as process 540). In some embodiments, the pressed green body can be calcined to remove binders (process 550), and sintered (e.g., using a pressure and thermal assisted sintering process 560), to produce a SinCREC nanorod-based ceramics and ceramic composite 225 (e.g., such as a SinCREC ceramic laser material 575).

In some further embodiments, high density and uniform green bodies can be obtained using a cold uniaxial pressing tool in a cylindrical cell at a pressure of up to about 200 MPa. In some embodiments, this method can significantly decrease the population of large pores (i.e., those greater than about 5 μm), which in some embodiments, can lead to a pre-compacted ceramic pellet with uniform density.

In some other embodiments of the invention, a pressure and/or thermal assisted process 560 can be used to achieve a highly transparent polycrystalline structure using starting ceramic powder 520. In some embodiments, one or more of the processing steps useful for producing SinCREC nanorod composite materials can be similar to conventional ceramic processing methods, except that the premixing of ceramic powders includes with SinCREC nanorods (schematically shown in FIG. 5). Since grains with an average size of an order of magnitude larger than that of the lasing light wavelength can cause formation of multiple transverse local modes within the grains, control over and limitation of the average grain size is necessary to suppress the local modes within the grains. In some embodiments, using the ceramic processing methods described herein, excessive grain growth during the sintering process can be reduced or eliminated. In some other embodiments, YAG- and MAS based SinCREC nanorod ceramics with preferred grain sizes can be fabricated using a low temperature-high pressure ("LTHP") process via a low pressure-assisted apparatus such as piston cylinder apparatus or a multi anvil cell. In some embodiments, these methods can enable densification in short sinter times, and can produce ceramic composites with minimized grain growth.

Some embodiments include methods of producing erbium chloride silicate nanorods for use in any of the methods of producing SinCREC nanorod-based ceramics and ceramic composites 225 described. For example, some embodiments can include the preparation and treatment of compound materials that include erbium chloride silicate (hereinafter "ECS") and erbium silicate (hereinafter "ES"). In some embodiments, direct CVD growth described in the following can result in ECS, but chlorine atoms can leave the nanorods when annealed at high temperature. In some embodiments, continued annealing can lead to recrystallization of the nanorods into ES with similarly high crystallinity.

In some embodiments, the growth of ECS and ES nanorods can be based on vapor-liquid-solid ("VLS") mechanism. This mechanism, while well-known for several decades, has been widely adopted for growing nanowires, nanorods, and other nano-morphologies only in the last decade. The method has been used for growing various nanomaterials including III-V materials such as GaSb and InSb various II-VI ternary and quaternary alloys using a novel dual gradient method described in at least A. Pan, et al., "Continuous Alloy-Composition Spatial Grading and Superbroad Wavelength-Tunable Nanowire Lasers on a Single Chip", Nano Letters, 9, 784 (2009), and A. L. Pan, et al., "Spatial composition grading of quarternary alloy ZnCdSSe nanowires with tunable emission between 350 nm and 710 nm on a single substrate", ACS Nano, 4, 671-680 (2010), and A. L. Pan, et al., "Quarternary Alloy Semiconductor Nanobelts with Bandgap Spanning the Entire Visible Spectrum", J. Am. Chem. Soc. (Communications), 131, 9502 (2009), the entire contents of which are incorporated herein by reference.

Some embodiments include methods of growth using either metal-catalyzed or self-catalyzed approaches. In the latter case, Ga or In can be used as catalytic metal for growing InSb and GaSb instead of gold or other metals. In some embodiments of the invention, single-crystal ECS nanorods can be grown in a one zone or three-zone horizontal reactor. For example, FIG. 6A shows a schematic of a horizontal three-zone reactor and process 600 for producing ECS nanorods in accordance with some embodiments of the invention. In some embodiments, silicon and $ErCl_3$ powders can be placed in separate ceramic alumina boats inside a hot wall reactor, and heated in a range between about 800° C. and about 1100° C. In some embodiments, a silicon or quartz substrate can be pre-deposited with metal catalysts (e.g., using Au for the metal-catalyzed approach) and then positioned in the low temperature zone (e.g., about 400-600° C., or higher). Some embodiments can use other metals and self-catalyzed growth with metallic elements contained in the to-be grown materials. In some embodiments, the growth substrate temperature can be between about 400° C. to about 600° C. or higher depending on the other growth parameters, and the size and morphologies that are preferred. In some embodiments, the chamber can be evacuated to a pressure below about 100 mTorr with a constant flow of about 50 standard centimeter cubic per minute of Ar-5% $H_2$ mixed gas introduced as a carrier gas through the reactor. In some embodiments, the pressure inside the chamber can be adjusted with a valve to about 400 mTorr during the growth phase from a few minutes to hundreds of minutes. In some embodiments of the invention, heating temperatures proximate the source material boats are adjusted and optimized in a three-zone set up to provide flexibility and control. In a typical growth process, some embodiments can use about 1080° C. and 800° C. for heating Si and ErCl₃ respectively. In some embodiments, following the growth phase, the furnace can be naturally cooled to room temperature (e.g., about 16° C. to about 28° C.).

In some embodiments of the invention, ceramic processing of various embodiments of SinCREC nanorod composite materials can be completed using pressure-assisted sintering. In some embodiments, pressure-assisted sintering can be used with lower temperatures to obtain high-quality transparent ceramic materials. In addition to enhanced mechanical strength due to low residual porosity, the resulting submicron size ceramic grains produced using this method can be highly transparent due to low Rayleigh scattering. In contrast, sintering at high temperatures and/or for long periods can result in abnormal or exaggerated grain growth. In some embodiments, multi-anvil cell sintering of MAS can be used to obtain a transparent ceramic at about 2 Gpa to about 4 Gpa at about 600° C. to about 800° C. Further, this method can be used for production of the fine nanostructured and near fully dense transparent (YAG) bulk materials at high pressure and modest temperature (about 2.0 GPa to about 5.0 GPa, and about 300° C. to about 500° C.) A further advantage of the pressure-assisted approach is that it does not require a sintering aid which can minimize the formation of optically detrimental inter-granular and intra-granular second segregated phases. Furthermore, some embodiments of the invention described herein can use small (less than about 200 nm) nano-size particles to improve the sintering properties of the ceramic powder, since the diffusion lengths from the middle of contact area of two adjacent particles to the neck zone is decreased to the order of a few nanometers. Therefore, some embodiments can use fine size nanoparticles (e.g., less than about 200 nm) for high pressure sintering to decrease sintering time, where the combination of high pressure and nano-sintering can result in a pore free transparent composite with the nanorod structure preserved in the composite ceramic matrix.

Figure 7:
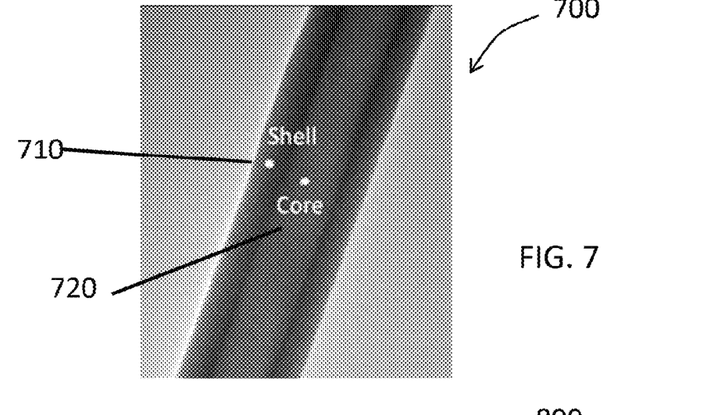
FIGS. 7-9 provide TEM images of nanorods at various magnifications in accordance with some embodiments of the invention.
Figure 8:
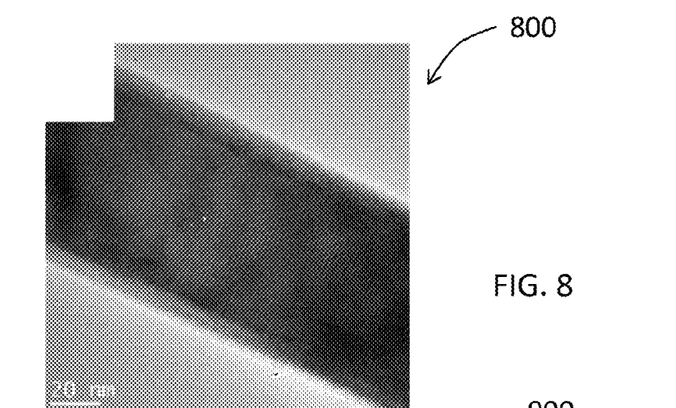
Figure 9:
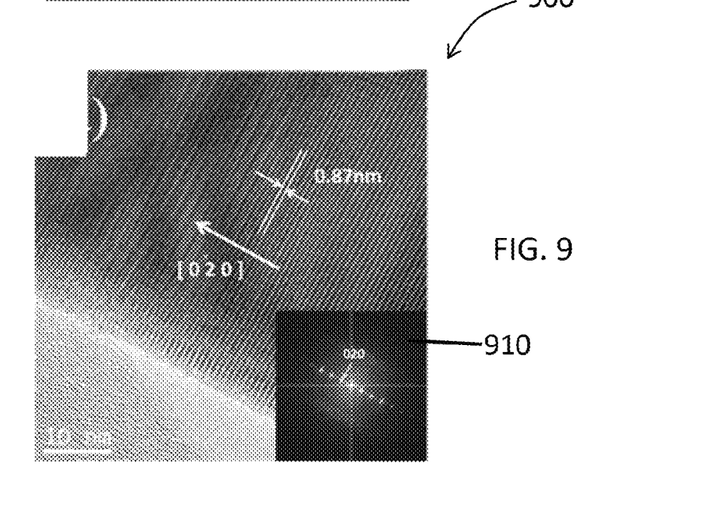

FIGS. 7-9 provide TEM images 700, 800, 900 respectively of SinCREC nanorods at various magnifications in accordance with some embodiments of the invention. As illustrated, using the synthesis methods described herein, defect-free SinCREC nanorods (e.g., such as SinCREC nanorods 255) can be synthesized for use in the SinCREC nanorod ceramics and ceramic composites 225 described earlier. As illustrated in FIG. 7, in some embodiments, the defect-free SinCREC nanorods can include a shell structure 710 enclosing a core structure 720.

Figure 10:
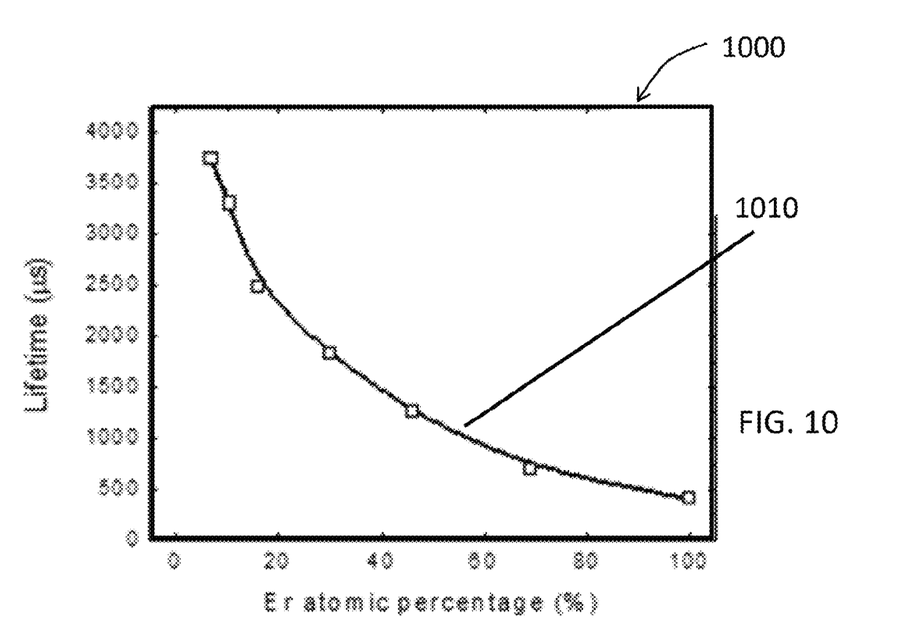
FIG. 10 illustrates a plot of lifetime as a function of erbium concentration in accordance with some embodiments of the invention.
Figure 11:
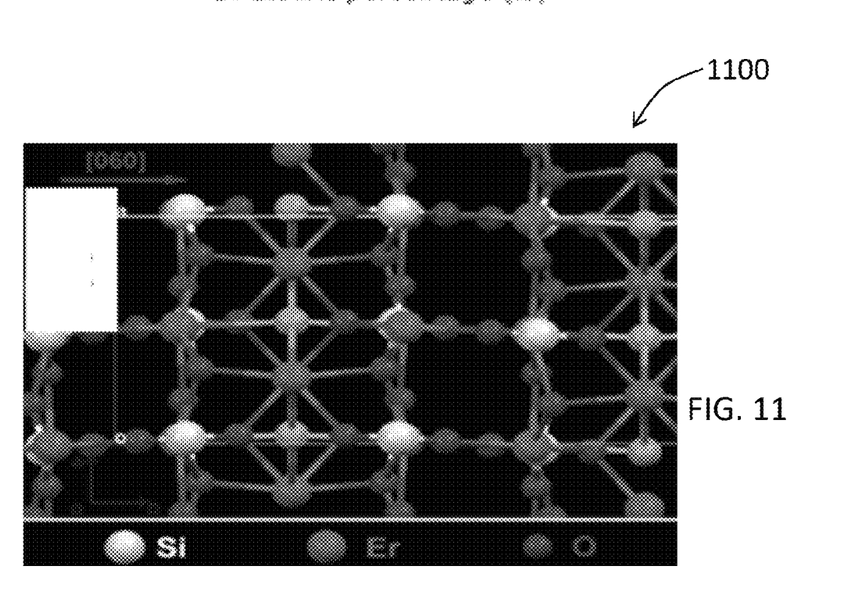
FIG. 11 depicts a lattice structure of rare-earth compound single crystal nanorods showing a periodic arrangement of erbium in the crystal in accordance with some embodiments of the invention.
Figure 12:
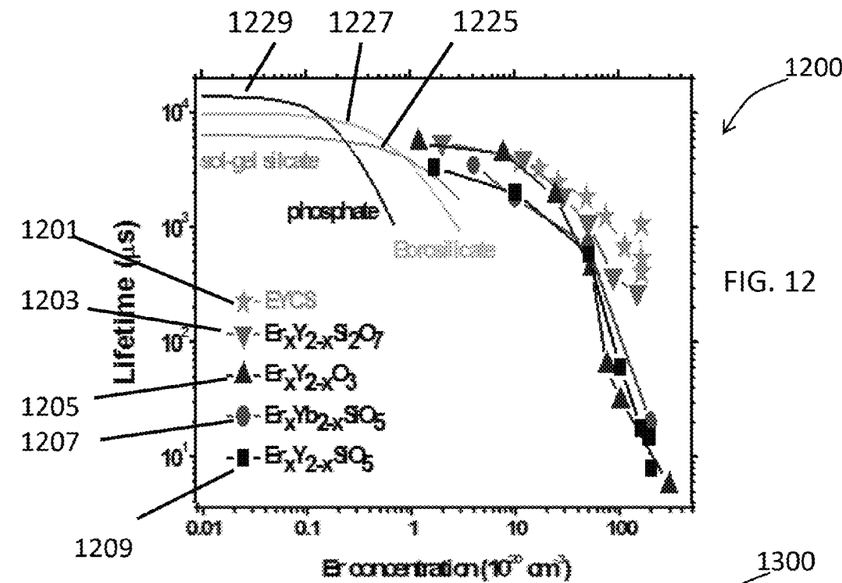
FIG. 12 provides a plot showing a comparison of embodiments of rare-earth compounds with conventional erbium-related materials for photoluminescence lifetime and erbium concentration in accordance with some embodiments of the invention.
Figure 13:
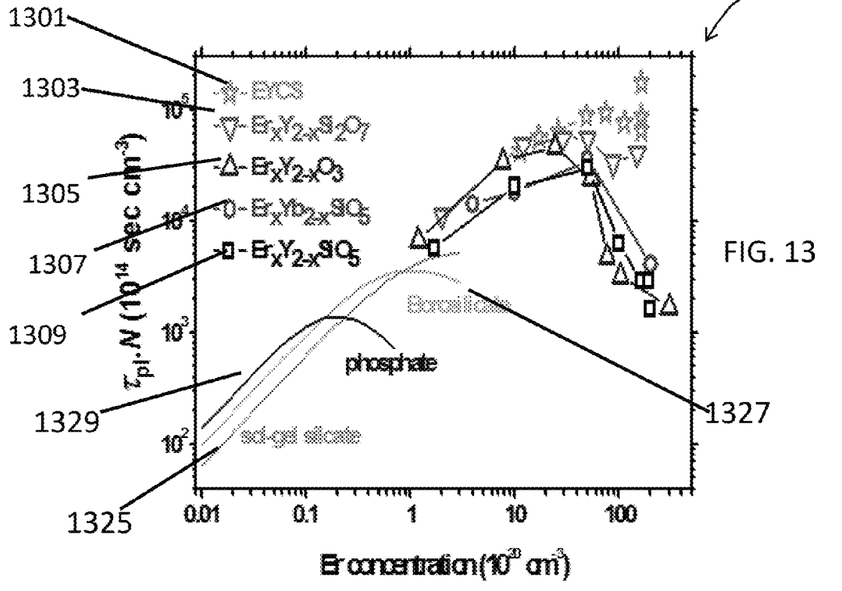
FIG. 13 provides a plot showing a comparison of embodiments of rare-earth compounds with conventional erbium-related materials for photoluminescence lifetime in accordance with some embodiments of the invention.

One of the most important figures of merit of light emission in SinCREC nanorod based materials are Er-concentration, the lattice structure (with periodic arrangement of Er), and the lifetime of photoluminescence. For example, FIG. 11 depicts a lattice structure 1100 of rare-earth compound single crystal nanorods showing a periodic arrangement of erbium in the crystal in accordance with some embodiments of the invention. FIG. 12 provides a plot 1200 showing a comparison of embodiments of rare-earth compounds with conventional erbium-related materials for the photoluminescence lifetime erbium concentration in accordance with some embodiments of the invention. For example, data for sol-gel silicate 1225, borosilicate 1227, and phosphate 1229 is shown comparing erbium yttrium chloride silicate ("EYCS") 1201, $Er_xY_{2-x}$, $Si_2O_7$ 1203, $Er_xY_{2-x}O_3$ 1205, $Er_xYb_{2-x}SiO_5$ 1207, and $Er_xY_{2-x}SiO_5$ 1209. Further, FIG. 13 provides a plot showing a comparison of embodiments of rare-earth compounds with conventional erbium-related materials for a product of photoluminescence lifetime and concentration in accordance with some embodiments of the invention. In this example, data for sol-gel silicate (shown as 1325), borosilicate (shown as 1327), and phosphate (shown as 1329) is shown comparing erbium yttrium chloride silicate ("EYCS") 1301, ErxY2-x Si2O7 1303, ErxY2-xO3 1305, ErxYb2-xSiO5 1307, and ErxY2-xSiO5 1309. As illustrated, the EYCS nanorods show the longest lifetime among all Er-materials of similar Er-concentration, and highest lifetime-concentration product of all Er-materials published in literature. In some further embodiments, the lifetime can be further controlled by growth condition and by continuously changing the relative Er and Y in alloying ECS and YCS, as demonstrated in FIG. 10 with lifetime (plot 1010) changing between 0.5 and 3.7 ms as the Er-density is varied.

Figure 14:
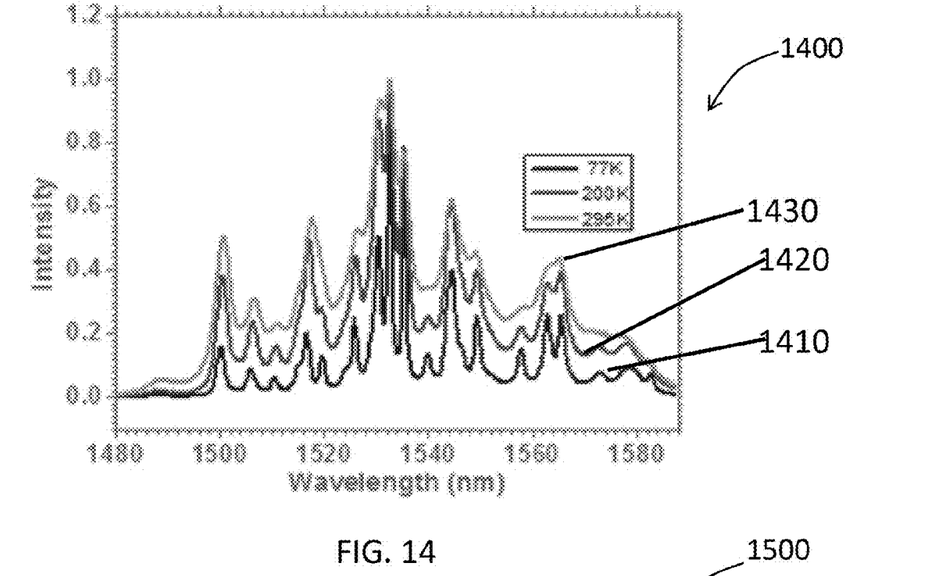
FIG. 14 illustrates a photoluminescence emission plot of embodiments of rare-earth compounds in accordance with some embodiments of the invention.
Figure 15:
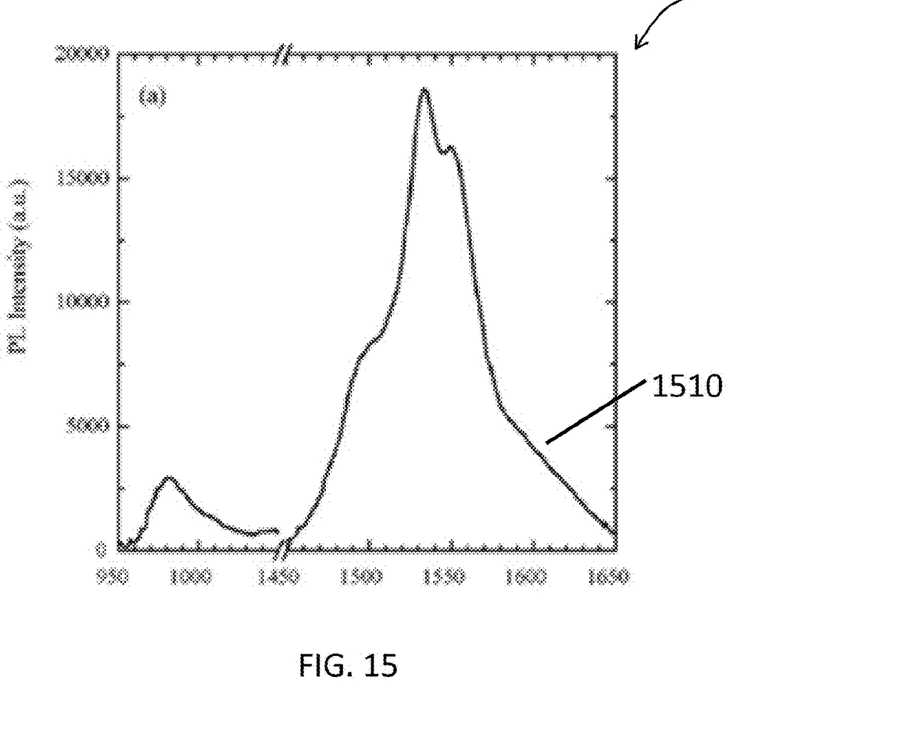
FIG. 15 illustrates a photoluminescence emission plot of conventional rare-earth compounds.
Figure 16:
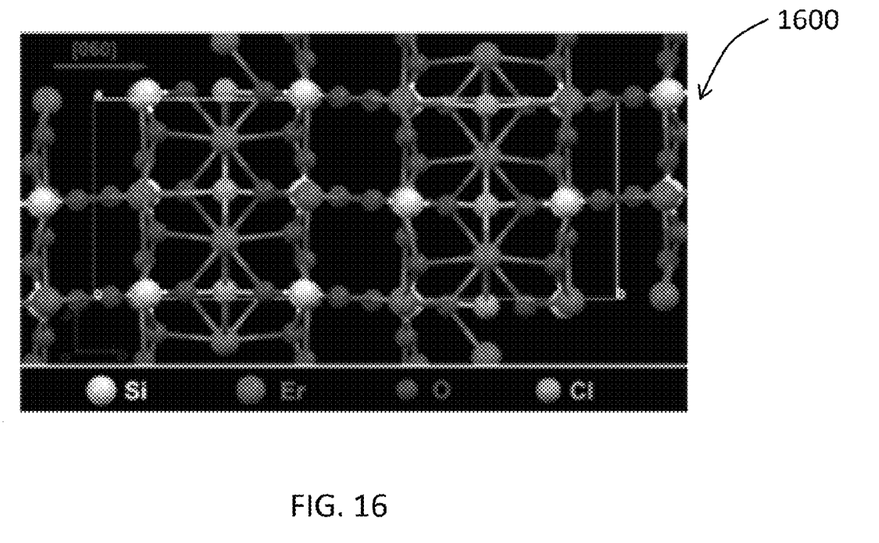
FIG. 16 depicts a crystal structure of embodiments of rare-earth compounds showing high density, periodically arranged erbium atoms in accordance with some embodiments of the invention.
Figure 17:
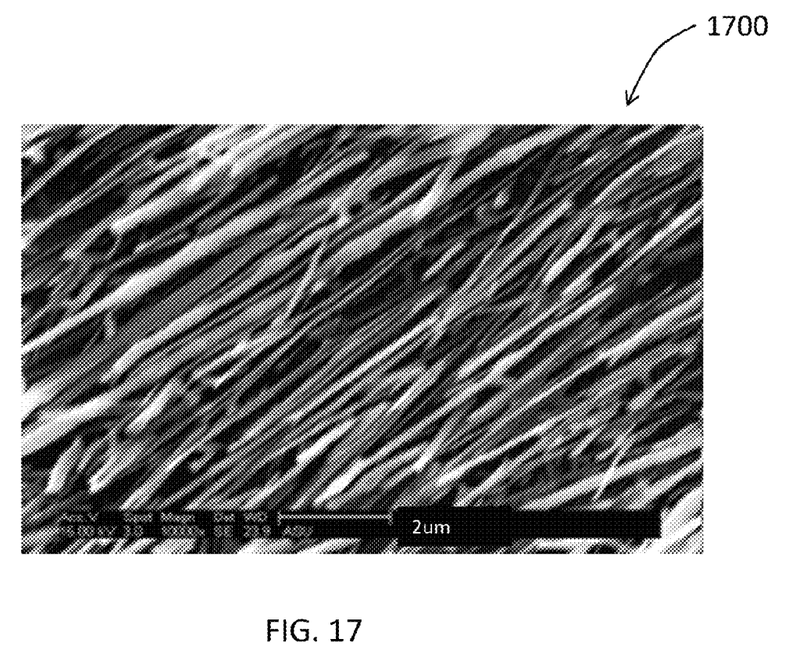
FIG. 17 shows an image of a Langmuir-Blodgett film made from embodiments of rare-earth compounds in accordance with some embodiments of the invention.

FIG. 14 illustrates a photoluminescence emission plot 1400 of embodiments of rare-earth compounds in accordance with some embodiments of the invention. The plots include data 1410 (77K), data 1420 (200K), and data 1430 (295K). When compared with FIG. 15, illustrating a photoluminescence emission plot 1500 with data 1510 of conventional rare-earth compounds, the data 1410, 1420, 1430 demonstrates photoluminescence around 1530 nm from ECS showing sharp spectral features when compared with similar photoluminescence from polycrystalline ES due to poor crystal quality. FIG. 16 depicts a crystal structure 1600 of embodiments of rare-earth compounds showing high density, periodically arranged erbium atoms in accordance with some embodiments of the invention, and FIG. 17 shows an image 1700 of a Langmuir-Blodgett film made from embodiments of rare-earth compounds in accordance with some embodiments of the invention.

This disclosure provides various embodiments of the invention. The scope of the invention is not limited by the various embodiments described herein. Numerous variations, whether explicitly provided for by the specification or implied by the specification, such as variations in structure, dimension, type of material and manufacturing process may be implemented by one of skill in the art in view of this disclosure. It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto.

The invention claimed is:

1. A ceramic composite synthesis method comprising:
providing a plurality of nanoparticles comprising at least one first rare-earth single-crystal compound;
mixing the plurality of nanoparticles with at least one ceramic material and at least one organic binder including at least one solvent;
preparing a ceramic green-body from the mixture; and
sintering the ceramic green-body to form a ceramic composite, the ceramic composite comprising a polycrystalline ceramic with a plurality of embedded single-crystal nanorods, the embedded single-crystal nanorods comprising at least one second rare-earth single crystal compound; and
wherein the at least one first rare-earth single-crystal compound comprises erbium silicate.

2. A ceramic composite synthesis method comprising:
providing a plurality of nanoparticles comprising at least one first rare-earth single-crystal compound;

mixing the plurality of nanoparticles with at least one ceramic material and at least one organic binder including at least one solvent;

preparing a ceramic green-body from the mixture; and sintering the ceramic green-body to form a ceramic composite, the ceramic composite comprising a polycrystalline ceramic with a plurality of embedded single-crystal nanorods, the embedded single-crystal nanorods comprising at least one second rare-earth single crystal compound; and wherein the at least one first rare-earth single-crystal compound comprises single crystal erbium chloride and the ceramic composite is an alloy with yttrium (Y) chloride silicate (CS) wherein the at least one second rare-earth single crystal compound comprises $Er_xY_{1-x}CS$ formed in-situ, where x is 0 to 1.

* * * * *